United States Patent [19]
Kobelt

[11] 3,837,420
[45] Sept. 24, 1974

[54] VEHICLE DISK BRAKE

[76] Inventor: Jack R. Kobelt, 235 E. 5th Ave., Vancouver 10, B.C., Canada

[22] Filed: Mar. 22, 1973

[21] Appl. No.: 343,782

[52] U.S. Cl.......... 188/71.6, 188/72.6, 188/264 AA
[51] Int. Cl............................................. F16d 65/84
[58] Field of Search............. 188/71.5, 71.6, 264 A, 188/264 AA, 72.6, 72.9, 18 A; 192/99 A, 70.24, 70.3

[56] References Cited
UNITED STATES PATENTS

| | | | |
|---|---|---|---|
| 1,898,313 | 2/1933 | Robbins | 188/71.5 |
| 2,174,395 | 9/1939 | Aikman | 188/71.5 |
| 2,701,626 | 2/1955 | Walther, Sr. | 188/71.6 |
| 3,444,966 | 5/1969 | Braukhoff | 188/264 A |

FOREIGN PATENTS OR APPLICATIONS 669,146   8/1963   Canada ...................... 188/264 AA

*Primary Examiner*—Trygve M. Blix
*Assistant Examiner*—Sherman D. Basinger

[57] ABSTRACT

This invention relates to novel improvements in a vehicle disk brake. A hub is rotatably mounted with respect to an axel. A brake disk guide is secured to the hub and a brake shoe guide is secured to the axel. At least one disk is slidably mounted on the disk guide and a plurality of brake shoes are slidably mounted in the brake shoe guide. Mounted external to the disk-shoe assembly is an actuation system of levers and linear actuators. The disk is ventilated and the disk guide is finned to provide a fan action to enhance heat dissipation. The brake shoes are split to permit replacement without removing the hub portion from the axel portion, and shaped to enhance air circulation in the disk brake assembly.

2 Claims, 4 Drawing Figures

VEHICLE DISK BRAKE

This invention relates to improvements in a vehicle disk brake and particularly to brakes normally found on the rear axles of heavy trucks. In conventional disk brakes, the disk is often fixed to a rotatable hub, the brake pads being pressed against the faces of the disk by a caliper which may be fixed to an axel or have both sides thereof slidably floating parallel to the axis of rotation of the hub.

It has been established in this art that disk brakes offer substantial improvements in performance over conventional expanding shoe or other types of drum brakes. Some of the advantages of disk brakes include stable front and rear braking balance, a significant reduction in high-temperature fade and uneven side-pull, better overall heat dissipation, and the use of rugged friction materials practicably available only in sheet form. Another very significant advantage is the substantial elimination of self-energization and self-locking found in drum brakes.

Whereas disk brakes have been sucessfully adapted to automobiles, particularly at the front wheels, a significant difficulty in adapting them to the rear axels of heavy trucks has been and continues to be the very limited space available as defined by ground clearance, tire rim, axel, hub, and frame suspension. A further difficulty is the heat dissipation requirements of such heavy duty applications as logging trucks working between mountain peaks and sea-level; such applications require a large exposed disk area, a large volume of friction material, both of which are difficult to accommodate in combination in the space available. Still another difficulty in conventional disk brakes is to provide the required actuation forces, for both running and parking applications, using proven conventional pneumatic actuators and control systems.

Accordingly, it is an object of my invention to provide a vehicle disk brake which may be adapted to the confined space of a rear truck axel.

It is another object of my invention to provide a vehicle disk brake having a large disk heat dissipating area within the fixed radial limits of a tire rim by stacking disks axially.

It is still another object of my invention to improve the life expectancy of disk brake shoes by providing a brake shoe area having a low pressure-velocity coefficient.

Yet another object of my invention is to provide a vehicle disk brake assembly in which the structure induces air flow through the assembly.

A further object of my invention is to provide a vehicle disk brake in which structure is adapted to permit replacement of the brake shoes without removing the hub from the vehicle axel.

Still another object of my invention is to provide the overall advantages to a truck rear axel of the known advantages of disk brakes over drum brakes, namely controlled brake balance, reduced fade, even pull, better heat dissipation, no self-energization and self-locking, the use of superior friction materials, and improved shoe life and maintenance characteristics.

Another object of my invention is to provide a disk brake which is readily adaptable in structure to existing and conventional truck axels.

Yet a further object of my invention is to provide a disk brake which is readily adaptable to the existing and proven pneumatic control systems found on conventional heavy trucks.

Still a further object of my invention is to provide a disk brake which may be actuated in the running and parking conditions by conventional and proven low-power pneumatic linear actuators currently in wide use in the trucking industry.

These and further objects of my invention will be evident from a study of the following disclosure and the accompanying drawings which illustrate a preferred embodiment of the invention. This embodiment of my invention is merely exemplary, in that the invention is capable of expression in structure other than that particularly described and illustrated, and is not intended to detract from the full scope of the invention as set out in the annexed claims.

In the drawings, wherein like numerals refer to like parts:

Figure 1:
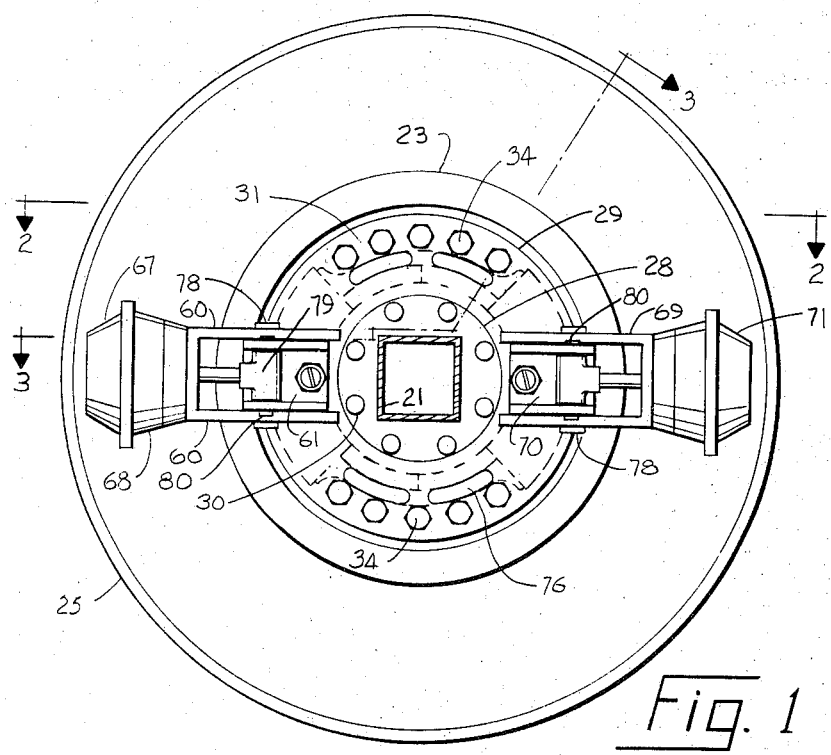
FIG. 1 is an elevation of my invention looking from the axel side of a wheel, tire, hub, and brake assembly.
Figure 2:
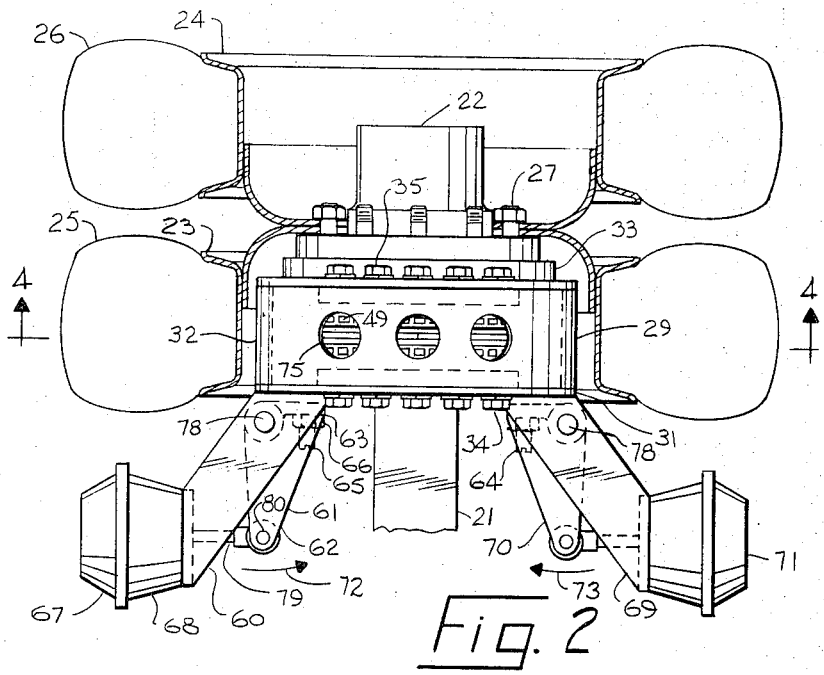
FIG. 2 is a plan view of my invention taken substantially along line 2—2 in FIG. 1, with the tires and rims sectioned to provide a better view of the disk brake assembly.

Turning now to the drawings, truck axel means 21 has hub means 22 rotatably mounted thereon. Dual wheel rims 23 and 24 and tires 25 and 26 are mounted by conventional stud means 27 on hub means 22. Flange 28 secured to axel means 21 is found on conventional axels, being used to support a spider-block in conventional expanding shoe drum brakes, and being employed in my invention to support shoe guide means 29 by means of rivets 30.

Shoe guide means 29 comprises axel mounting portion 31, splined shoe portion 32, and shoe backing ring 33; these three parts of shoe guide means 29 are bolted together by assembly bolts 34 and 35. It will be evident to one skilled in the art that the type of structure illustrated permits splined shoe portion 32 to be readily machined and removed from axel portion 31 for brake replacement. The inner diameter at 35 of ring 33 is substantially larger than the outer diameter at 37 of hub means 22; hence by removing bolts 34, splined portion 32 and ring 33 may be removed axially from the axel, once rims 23 and 24 are removed, without disturbing the rotatable interconnection between axel 21 and hub 22.

Figure 3:
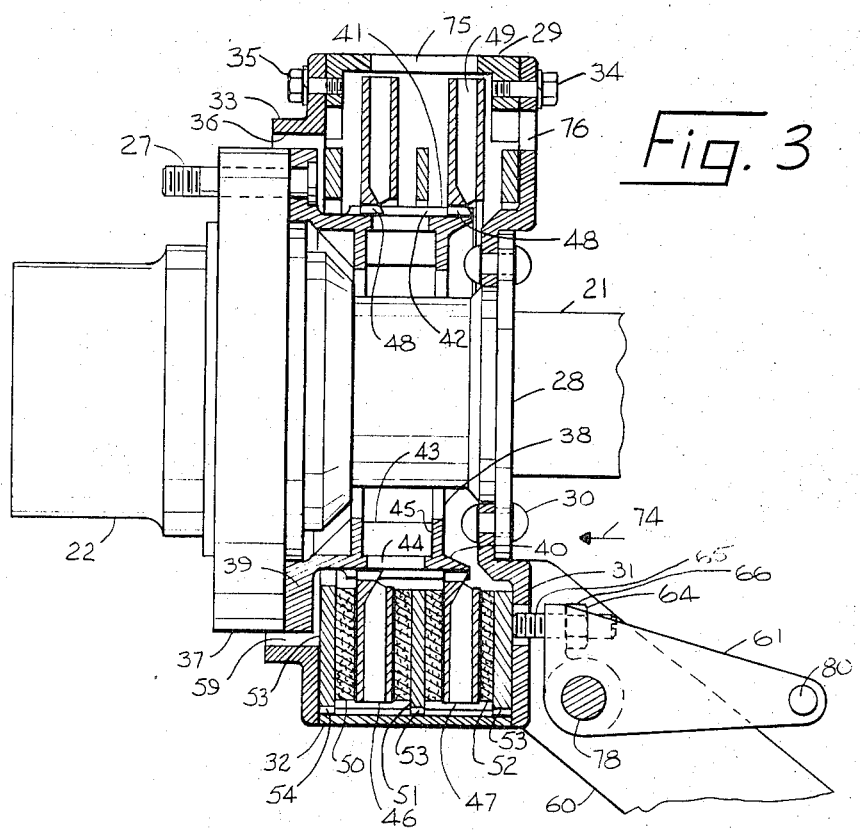
FIG. 3 is a sectional view of my invention taken substantially along line 3—3 of FIG. 1, showing the two unsymmetrical sectional views of the inner structures of the disk brake assembly.
Figure 4:
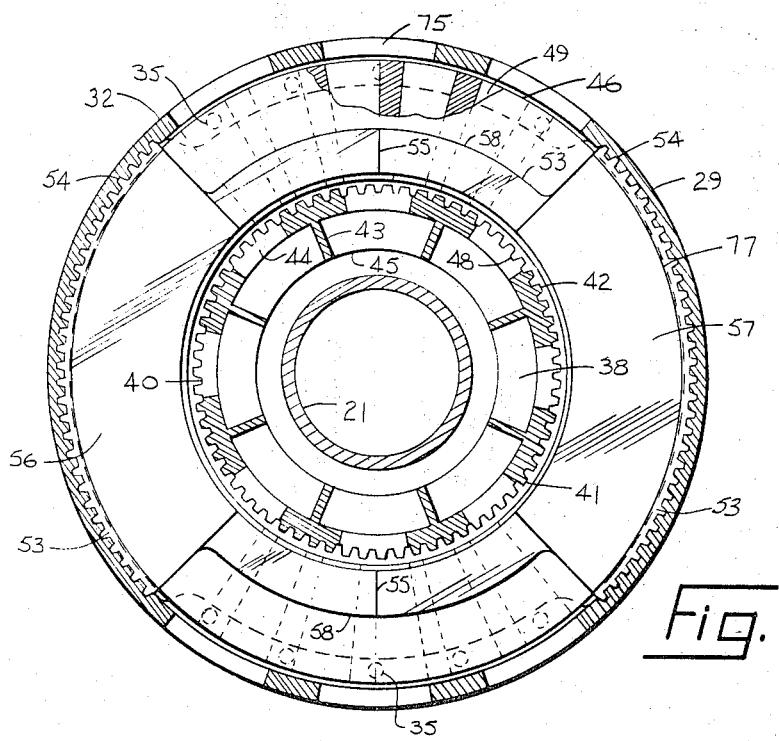
FIG. 4 is a sectional view of my invention taken substantially along line 4—4 in FIG. 2, with the wheel rim and tire removed.

FIGS. 3 and 4 illustrate the structure of disk guide means 38, comprising flange portion 39 and guide portion 40. Flange portion 39 is secured to hub means 22 by stud means 27 in a fashion equivalent to the mounting of a drum in a conventional expanding shoe drum brake. Guide portion 40 has on its outer cylindrical surface 41 a plurality of splines 42 and on its inner cylindrical surface a plurality of fins 43. A plurality of ventilation holes 44 interconnect the inner and outer cylindrical surfaces of guide portion 40. Strength reinforcing rings 45 form an integral part of guide portion 40.

Slidably mounted on guide portion 40 are outer disk 46 and inner disk 47. Splines 48 on the inner cylindrical surface of disks 46 and 47 mesh with splines 42 to fix disks 46 and 47 tangentially while permitting slidable motion thereof parallel to the axis of rotation of hub means 22. Ventilation holes 49 interconnect the inner and outer cylindrical surfaces of disks 46 and 47.

Slidably mounted in splined shoe portion 32 of shoe guide means 29 is a plurality of brake shoes comprising outer shoe 50, center shoe 51 and inner shoe 52. Outer shoe 50 interfaces the outer surface of outer disk 46; center shoe 51 interfaces inner face of disk 46 and the outer face of disk 47; inner shoe 52 interfaces the inner surface of disk 47. Substantially diametrically opposite shoes 50, 51, and 52, are a second identical set of brake shoes 77. Each brake shoe has a back-plate 53 which has a splined portion 54 substantially matching the splines in shoe guide portion 32; these splines fix the brake shoes tangentially while permitting motion thereof parallel to the axis of rotation of hub means 22. The back-plates of each pair of diametrically opposite brake shoes form substantially two halves of a ring about disk guide portion 40, abutting at 55 as shown in FIG. 4; this interaction between diametrically opposite shoe backplates fixes the brake shoes radially with respect to hub means 22 and disk guide means 38. Hence, both sets of shoes 50, 51 and 52 may be installed or replaced radially, once shoe guide portion 32 is removed, by sliding the shoes into their positions in relation to disks 46 and 47. Once the shoes abut at 55 and guide portion 32 is in place, the shoes can move only parallel to the axis of rotation of hub means 22 in a manner whereby to squeeze the disks therebetween. Backplates 53 are recessed radially as indicated by contour 58 in the areas between the friction material pads 56 and 57, thus permitting air circulation around disks 46 and 47.

Ventilation holes 76 and 75 in axel portion 31 and shoe portion 32 of shoe guide means 29 permit air entry and exit respectively. In addition, clearance 59 between hub means 22 and ring 33 permits entry of further cooling air into the brake assembly.

Forming an integral part of axel portion 31 of shoe guide means 29 are bracket members 60. Pivotally mounted between bracket members 60 by means of pin 78 is an L-shaped lever 61 having an actuated end 62 and an actuating end 63. Mounted on actuating end 63 is a slackadjusting means 64 comprising bolt 65 and nut 66. Bolt 65 bears on back-plate 53 of shoe 52 and can be extensibly adjusted to compensate for wear of shoes 50, 51, and 52. Pivotally connected by pin 80 to the actuated end 62 of lever 61 is the rod portion 79 of conventional pneumatic brake actuating means 67. Chamber portion 68 of actuating means 67 is secured to brackets 60; clearly, actuating means 67 may be pneumatically actuated with or without spring fail-safe actuation. A second set of brackets 69, lever 70, and actuating means 71 serve to actuate the second set of brake shoes 77 located substantially diametrically opposite brake shoes 50, 51, and 52. Parallel pneumatic interconnection between actuating means 70 and 71 will provide substantially equal actuation forces on both sets of diametrically opposite brake shoes.

It will now be understood from the foregoing description that actuation of levers 61 and 70, respectively by actuating means 67 in direction 72 and actuating means 71 in direction 73 will cause disks 46 and 47 and shoes 50, 51 and 52 to move in direction 74, the disks being squeezed between the shoes. When actuation of levers 61 and 70 is discontinued, the disks are released. Considering now the case where hub 22 is rotating with respect to axel 21, as is the case when a truck is in motion, then the actuation of levers 61 and 70 will cause disks 46 and 47, which are rotating with hub 22, to be braked. While rotation exists, air will be drawn into the disk brake assembly through ventilation holes 76 and clearance 59, fanned radially outward by fins 43 over the outer surfaces and through the ventilation holes of disks 46 and 47, finally exiting through ventilation holes 75 in shoe guide portion 32.

Installation of my invention on a conventional truck axle, in replacement of a conventional expanded shoe drum brake, will be understood by one skilled in the art to be simply a matter of replacing the conventional spider block with axel portion 31 and the drum with disk guide means 38. The existing pneumatic control system and brake actuators may be used substantially without modification.

It is believed that my invention of a vehicle disk brake will have been clearly understood from the foregoing detailed description of my now preferred and illustrated embodiment. Various modifications, changes, additions, and equivalents may be resorted to in view of these teachings by one skilled in this art without departing from the spirit of my invention. Therefore, whereas a choice between such variations, modifications, changes, additions, and equivalents falling within the true scope of my invention will depend largely upon the circumstances in which my invention is used, it is my express intention that no limitations be implied and that the hereto annexed claims be given the broadest interpretation to which the language fairly admits.

The embodiments of the invention in which an exclusive property or privilege is claimed are defined as follows:

1. A disk brake apparatus in combination with a vehicle axle means, a hub means rotatably mounted on said axle means, a shoe guide means comprising a splined shoe portion and a shoe backing ring and an axle mounting portion, said axle mounting portion operatively secured to said axle means, the smallest inner diameter of said shoe backing ring being substantially greater than the largest outer diameter of said hub means, a disk guide means operatively secured to said hub means, a brake disk slidably mounted on said disk guide means for movement along the axis of rotation of said hub means, a plurality of brake shoes slidably mounted on said shoe guide means for movement along the axis of rotation of said hub means, a lever having an actuated and an actuating portion, bracket means secured to said axle mounting portion, said lever pivotally mounted on said bracket means, an actuating means mounted on said bracket means and operatively connected to said actuated portion of said lever, said actuating portion of said lever operatively connected to one of said plurality of brake shoes, said brake disk having inner and outer cylindrical surfaces, a plurality of radial ventilation holes interconnecting said inner and outer cylindrical surfaces of said brake disk, said disk guide means having inner and outer cylindrical surfaces, a plurality of radial fins secured to said inner cylindrical surface of said disk guide means and a plurality of radial ventilation holes interconnecting said inner and outer cylindrical surfaces of said disk guide means, whereby actuation of said actuated portion of said lever causes said disk to be squeezed between said plurality of brake shoes and said shoe backing ring and splined shoe portion may be removed from said axle means without removing said hub means and air is fanned through said disk brake apparatus when said hub means rotates.

2. A disk brake apparatus in combination with a vehicle axle means, a hub means rotatably mounted on said axle means, a shoe guide means comprising a splined shoe portion and a shoe backing ring and an axle mounting portion, said axle mounting portion operatively secured to said axle means, the smallest inner diameter of said shoe backing ring being substantially greater than the largest outer diameter of said hub means, a disk guide means having inner and outer cylindrical surfaces and operatively secured to said hub means, a plurality of disks slidably mounted on said outer cylindrical surface of said disk guide means for movement along the axis of rotation of said hub means, a plurality of brake shoes slidably mounted in said shoe guide means for movement along the axis of rotation of said hub means, said disk guide means having a plurality of radial fins on said inner cylindrical surface and a plurality of ventilation holes interconnecting said inner and outer cylindrical surfaces, a pair of levers each having an actuated portion and an actuating portion, bracket means secured to said axle mounting portion on substantially opposite diametral portions of said vehicle axle means, said levers pivotally mounted on said bracket means, a pair of actuating means mounted on said bracket means and operatively connected to said actuated portion of said lever, each of said actuating portions of said pair of levers operatively connected to one of said plurality of brake shoes, whereby actuation of said actuated portions of said pair of levers causes said plurality of brake disks to be squeezed between said plurality of brake shoes and whereby said shoe backing ring and splined shoe portion may be removed from said axle means without removing said hub means.

* * * * *